United States Patent
Motoki et al.

(10) Patent No.: US 6,730,624 B2
(45) Date of Patent: May 4, 2004

(54) NON-REDUCING DIELECTRIC CERAMIC, MONOLITHIC CERAMIC CAPACITOR USING THE SAME, AND METHOD FOR MAKING NON-REDUCING DIELECTRIC CERAMIC

(75) Inventors: Tomoo Motoki, Izumo (JP); Masahiro Naito, Shiga-ken (JP); Harunobu Sano, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 10/427,978

(22) Filed: May 2, 2003

(65) Prior Publication Data

US 2003/0210512 A1 Nov. 13, 2003

Related U.S. Application Data

(62) Division of application No. 09/828,013, filed on Apr. 6, 2001, now Pat. No. 6,617,273.

(30) Foreign Application Priority Data

Apr. 7, 2000 (JP) ........................................ 2000-106907

(51) Int. Cl.⁷ ...................... C04B 35/465; H01G 4/008; H01G 4/10; H01G 4/12

(52) U.S. Cl. .................... 501/136; 361/305; 361/321.2; 361/321.4; 264/615

(58) Field of Search ........................ 501/136; 264/615; 361/305, 321.2, 32.4

(56) References Cited

U.S. PATENT DOCUMENTS 6,233,134 B1 * 5/2001 Sakamoto et al. .......... 361/311
6,617,273 B2 * 9/2003 Motoki et al. .............. 501/136

* cited by examiner

*Primary Examiner*—David Brunsman
(74) *Attorney, Agent, or Firm*—Dickstein, Shapiro, Morin & Oshinsky, LLP.

(57) ABSTRACT

A non-reducing dielectric ceramic contains Ca, Zr and Ti as metallic elements and does not contain Pb. In a CuKα X-ray diffraction pattern, the ratio of the maximum peak intensity of secondary crystal phases to the maximum peak intensity at 2θ=25° to 35° of a perovskite primary crystal phase is about 12% or less, the secondary crystal phases including all the crystal phases other than the perovskite primary crystal phase. The non-reducing dielectric ceramic exhibits superior insulating resistance and dielectric loss after firing in a neutral or reducing atmosphere and high reliability in a high-temperature loading lifetime test and is useful for producing compact high-capacitance monolithic ceramic capacitors.

16 Claims, 2 Drawing Sheets

NON-REDUCING DIELECTRIC CERAMIC, MONOLITHIC CERAMIC CAPACITOR USING THE SAME, AND METHOD FOR MAKING NON-REDUCING DIELECTRIC CERAMIC

This is a division of application Ser. No. 09/828,013, filed Apr. 6, 2001 now U.S. Pat. No. 6,617,273.

BACKGROUND OF THE INVENTION

1. Field of the Invention

The present invention relates to non-reducing dielectric ceramics, monolithic ceramic capacitors using the same, and methods for making the non-reducing dielectric ceramics.

2. Description of the Related Art

In various electronic devices, the rapid trends toward a reduction in size and greater packing density are producing an increasing demand for monolithic ceramic capacitors which allow such trends to continue to advance. Also, the use of the monolithic ceramic capacitors is being investigated in other industrial fields, including for use in vehicles and the like. Other desired requirements for the monolithic ceramic capacitors include further reduction in cost and higher reliability.

The need to meet these requirements has promoted the development of non-reducing dielectric ceramic materials which use inexpensive base metals as internal electrode materials, which are not changed into semiconductive materials during firing in a neutral or reducing atmosphere with a low oxygen partial pressure so as not to oxidize the internal electrode materials, and which exhibit superior dielectric characteristics.

For example, as non-reducing dielectric ceramic materials, Japanese Unexamined Patent Application Publication Nos. 60-131708, 63-126117, 5-217426, 10-335169, 10-330163, and 11-106259 disclose $(Ca_{1-x}Sr_x)_m(Zr_{1-y}Ti_y)O_3$-based, $[(Ca_xSr_{1-x})O][(Ti_yZr_{1-y})O_2]$-based and $(CaO)_x(Zr_{1-y}Ti_y)O_2$-based compositions.

The use of these non-reducing dielectric ceramic materials enables production of inexpensive, reliable monolithic ceramic capacitors which are not converted into semiconductive materials during firing in reducing atmospheres and which use base metals such as nickel and copper as internal electrodes.

In the non-reducing dielectric ceramics disclosed in Japanese Unexamined Patent Application Publication Nos. 60-131708 and 63-126117, the main component materials, e.g., calcium carbonate ($CaCO_3$), strontium carbonate ($SrCO_3$), titanium dioxide ($TiO_2$) and zirconium dioxide ($ZrO_2$), a subsidiary component material, e.g., manganese dioxide ($MnO_2$), and a mineralizer, e.g., silicon dioxide ($SiO_2$), are simultaneously calcined in order to prepare ceramics represented by $(Ca_{1-x}Sr_x)_m(Zr_{1-y}Ti_y)O_3$. The calcined raw material powder does not have a single perovskite structure, but, rather, has a mixed crystal system containing a perovskite primary crystal phase and other secondary crystal phases according to analysis by X-ray diffraction. Also, a dielectric ceramic obtained by firing this calcined raw material powder in a reducing atmosphere has a mixed crystal system. Such an non-homogeneous crystal structure in the dielectric ceramic tends to reduce the reliability of devices as the thickness of the ceramic is reduced to produce compact high-capacitance monolithic ceramic capacitors when they are subjected to high-temperature loading lifetime testing.

In the non-reducing dielectric ceramics disclosed in Japanese Unexamined Patent Application Publication Nos. 5-217426 and 10-335169, powders of calcium titanate ($CaTiO_3$), strontium titanate ($SrTiO_3$), strontium zirconate ($SrZrO_3$) and calcium zirconate ($CaZrO_3$) are used as starting materials in order to prepare ceramics represented by $(Ca_{1-x}Sr_x)_m(Zr_{1-y}Ti_y)O_3$ and $[(Ca_xSr_{1-x})O][(Ti_yZr_{1-y})O_2]$. After weighing these powders, the resulting ceramic is obtained through wet mixing, molding, binder removal and firing. In this method, however, $CaTiO_3$, $SrTiO_3$, $SrZrO_3$ and $CaZrO_3$ having perovskite structures barely dissolve into each other. Therefore, the resulting dielectric ceramic has a mixed crystal system including a plurality of perovskite crystal phases. When the thickness of the elements is reduced to produce compact high-capacitance monolithic ceramic capacitors, the lifetimes of the monolithic ceramic capacitors in a high-temperature loading lifetime test vary and the reliability thereof tends to be impaired.

In the non-reducing dielectric ceramics disclosed in Japanese Unexamined Patent Application Publication Nos. 10-330163 and 11-106259, predetermined amounts of calcium carbonate ($CaCO_3$), titanium dioxide ($TiO_2$), zirconium dioxide ($ZrO_2$) and manganese carbonate ($MnCO_3$) are used as starting materials, a predetermined amount of glass component is used, and these are mixed, molded, subjected to binder removal and fired in order to prepare ceramics represented by $(CaO)_x(Zr_{1-y}Ti_y)O_2$. In this method, however, the formation of a perovskite crystal phase as the primary crystal phase is impaired and the resulting dielectric ceramic has a mixed crystal system including the perovskite primary crystal phase and other secondary crystal phases. When the thickness of the elements is reduced to produce compact high-capacitance monolithic ceramic capacitors, the reliability of the monolithic ceramic capacitor tends to be reduced.

SUMMARY OF THE INVENTION

Accordingly, it is an object of the present invention to provide a non-reducing dielectric ceramic which does not cause deterioration of insulating resistance and dielectric loss during firing in a neutral or reducing atmosphere, and which exhibits a prolonged lifetime with a reduced variation in high-temperature loading lifetime testing when the thickness of the elements is reduced, and high reliability.

It is another object of the present invention to provide a monolithic ceramic capacitor using the non-reducing dielectric ceramic. It is still another object of the present invention to provide a method for making a non-reducing dielectric ceramic.

A non-reducing dielectric ceramic according to the present invention comprises Ca, Zr and Ti as metallic elements and does not contain Pb. In a CuKα X-ray diffraction pattern, the ratio of the maximum peak intensity of secondary crystal phases to the maximum peak intensity at $2\theta=25°$ to $35°$ of a perovskite primary crystal phase is about 12% or less, wherein the secondary crystal phases include all the crystal phases other than the perovskite primary crystal phase. The ceramic may be represented by $A_pBO_3$ where A includes Ca, B includes Zr and Ti, and p is about 0.98 to 1.02.

The ratio of the maximum peak intensity of the secondary crystal phases to the maximum peak intensity of the perovskite primary crystal phase is preferably about 5% or less and more preferably about 3% or less.

Since the ratio of the maximum peak intensity of the secondary crystal phases to the maximum peak intensity of the perovskite primary crystal phase is about 12% or less, the secondary crystal phase content in the overall crystal phases is low. Thus, the resulting dielectric ceramic does not cause deterioration of insulating resistance and dielectric loss during firing in a neutral or reducing atmosphere, and exhibits a prolonged lifetime with a reduced variation in high-temperature loading lifetime testing when the thickness of the dielectric ceramic layer is reduced to about 5 mm or less and high reliability.

A monolithic ceramic capacitor in accordance with the present invention comprises a plurality of dielectric ceramic layers, internal electrodes provided between dielectric ceramic layers and external electrodes electrically connected to the internal electrodes, wherein the dielectric ceramic layers comprise the above-mentioned dielectric ceramic and the internal electrodes comprise a base metal. The base metal is preferably elemental nickel, a nickel alloy, elemental copper or a copper alloy.

Since the monolithic ceramic capacitor in accordance with the present invention uses the above-mentioned non-reducing dielectric ceramic, the monolithic ceramic capacitor does not cause deterioration of insulating resistance and dielectric loss during firing in a neutral or reducing atmosphere, and exhibits a prolonged lifetime with a reduced variation in high-temperature loading lifetime testing when the thickness of the dielectric ceramic layer is reduced to about 5 μm or less, and high reliability.

In a method for making a non-reducing dielectric ceramic comprising Ca, Zr and Ti as metallic elements and not containing Pb, and in a CuKα X-ray diffraction pattern, the ratio of the maximum peak intensity of secondary crystal phases to the maximum peak intensity at 2θ=25 to 35° of a perovskite primary crystal phase is about 12% or less, wherein the secondary crystal phases include all the crystal phases other than the perovskite primary crystal phase, the method comprises the steps of:

(A) calcining an uncalcined B-site component powder to prepare a calcined B-site component powder, wherein the dielectric ceramic is represented by the general formula $ABO_3$;

(B) preparing a A-site component powder from A-site component materials;

(C) mixing the B-site component powder and the A-site component powder to prepare an uncalcined primary material powder;

(D) calcining the uncalcined primary material powder to prepare a calcined primary material powder;

(E) adding at least one of the A-site component powder and the B-site component powder to the calcined primary material powder for finely adjusting the composition of the calcined primary material powder to prepare a secondary material powder; and (F) molding and firing the secondary material powder in a neutral or reducing atmosphere.

This method can produce dielectric ceramics with high reproducibility and high efficiency.

DESCRIPTION OF THE PREFERRED EMBODIMENTS

Figure 1:
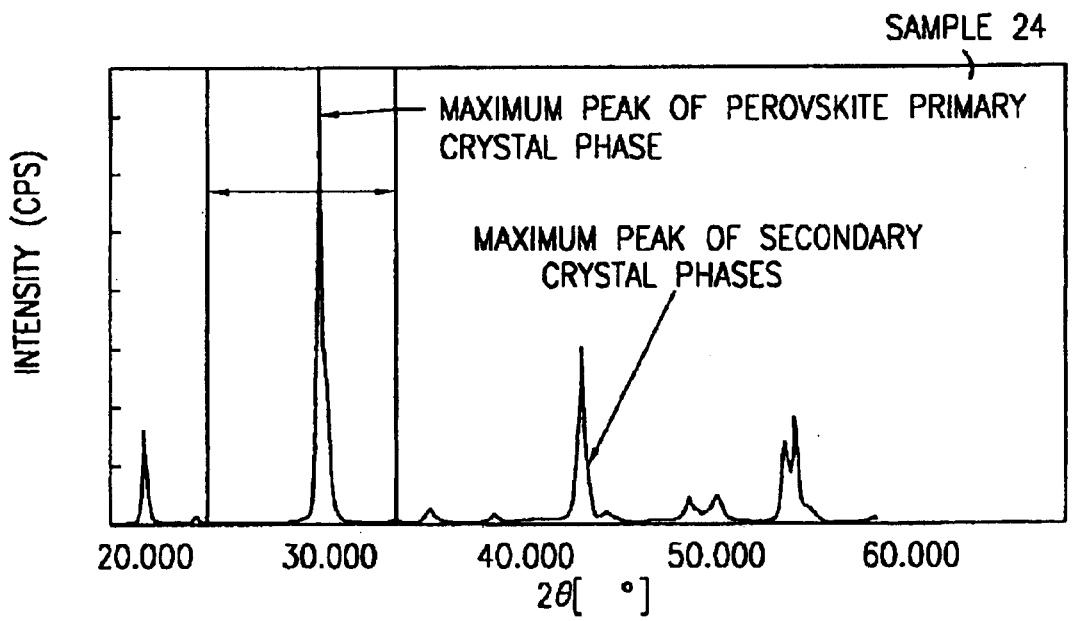
FIG. 1 illustrates an X-ray diffraction pattern of a dielectric ceramic of Sample 24.

The present invention will now be described with reference to the following non-limiting Examples.

EXAMPLE 1

Powders of $CaCO_3$, $SrCO_3$, $BaCO_3$, $ZrO_2$, $TiO_2$ and $HfO_2$, each having a purity of 99% or more, were prepared as starting materials.

$ZrO_2$, $TiO_2$ and $HfO_2$ were weighed as raw material powders for the B-site component in the perovskite primary crystal phase represented by $ABO_3$, such that x and y in the formula $(Zr_{1-x-y}Ti_xHf_y)O_3$ became the values shown in Table 1. These raw material powders were wet-mixed and pulverized in a ball mill for at least 16 hours and were dried to prepare an uncalcined B-site component powder.

Each uncalcined B-site component powder was calcined at each of the temperatures shown in Table 1 for 1 to 2 hours in air to prepare a calcined B-site component powder.

Next, $CaCO_3$, $SrCO_3$ and $BaCO_3$ were weighed as raw material powders for the A-site component so that v, w and k in the formula $$(Ca_{1-v-w}Sr_vBa_w)_k(Zr_{1-x-y}Ti_xHf_y)O_3$$ 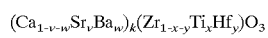

became the values shown in Table 1.

These raw material powders for the A-site component were added to the calcined B-site component to prepare an uncalcined primary material powder. The uncalcined primary material powder was wet-mixed and pulverized for at least 16 hours in a ball mill, dried and calcined at 1,000° C. to 1,200° C. for 2 hours in air to prepare a calcined primary material powder. The resulting calcined primary material powder had an average particle diameter of about 0.8 μm or less.

In Sample 34 in Table 1, $CaZrO_3$ and $SrTiO_3$ which had perovskite crystal structures were used as starting materials. These materials were weighed based on the formulation shown in Table 1 and were wet-mixed to prepare a primary material powder containing the A-site and B-site components without calcination.

In order to finely adjust the composition, $CaCO_3$, $SrCO_3$, $BaCO_3$, $ZrO_2$, $TiO_2$ and $HfO_2$ were weighed so that the p value in the formula $(Ca_{1-v-w}Sr_vBa_w)_p(Zr_{1-x-y}Ti_xHf_y)O_3$ became the values shown in Table 1 and were added to 100 mole of the calcined primary material powder of each of Samples 1 to 34. Secondary material powders having finely adjusted compositions of the formula $(Ca_{1-v-w}Sr_vBa_w)P(Zr_{1-x-y}Ti_xHf_y)O_3$ were thereby prepared.

Then, in order to prepare a secondary material powder containing a MnO subsidiary component, $MnCO_3$ having a purity of 99% or more was weighed and added to each secondary material powder so that 2 moles of MnO was present with respect to 100 mole of the secondary material powder.

To 100 parts by weight of secondary material powder containing MnO, either a sintering auxiliary (Sintering Auxiliary A) composed of 25% by weight $Li_2O$, 2% by weight MgO, 6% by weight CaO, 6% by weight SrO, 6% by weight BaO, 48% by weight $SiO_2$, 5% by weight $TiO_2$ and 2% by weight $Al_2O_3$ or a sintering auxiliary (Sintering Auxiliary B) composed of 36% by weight $(Si_{0.98}Ti_{0.02})O_2$, 55% by weight $(Mn_{0.8}Ni_{0.2})O$ and 9% by weight CaO was added in an amount of 1 part by weight so as to prepare formulated powders.

TABLE 1

| Sample | Calcined Primary Material Powder Composition $(Ca_{1-v-w}Sr_vBa_w)_k(Zr_{1-x-y}Ti_xHf_y)O_3$ | | | | | Particle Size of Uncalcined B-Site Component (μm) | Firing Temperature of Uncalcined B-Site Component (° C.) | Composition of Formulated Material | |
|---|---|---|---|---|---|---|---|---|---|
| | v | w | x | y | k | | | p | Sintering Auxiliary |
| 1 | 0.01 | 0 | 0.01 | 0.01 | 0.985 | 0.10 | 1150 | 0.990 | A |
| 2 | 0.01 | 0 | 0.01 | 0.01 | 0.995 | 0.07 | 1150 | 1.000 | A |
| 3 | 0.01 | 0 | 0.01 | 0.01 | 0.990 | 0.10 | 1150 | 0.995 | A |
| 4 | 0.01 | 0 | 0.01 | 0.01 | 0.990 | 0.10 | 1150 | 0.995 | B |
| 5 | 0.01 | 0 | 0.01 | 0.01 | 0.975 | 0.15 | 1150 | 1.000 | A |
| 6 | 0.01 | 0 | 0.01 | 0.01 | 0.990 | 0.12 | 900 | 1.000 | A |
| 7 | 0.01 | 0 | 0.01 | 0.01 | 0.930 | 0.35 | 1150 | 0.980 | A |
| 8 | 0.01 | 0 | 0.01 | 0.01 | 1.020 | 0.20 | 1100 | 1.020 | A |
| 9 | 0.01 | 0 | 0.01 | 0.01 | 0.950 | 0.10 | 1150 | 0.940 | A |
| 10 | 0.01 | 0 | 0.01 | 0.01 | 0.990 | 0.10 | 1150 | 1.040 | A |
| 11 | 0.05 | 0.08 | 0.05 | 0.02 | 0.990 | 0.15 | 1100 | 1.000 | A |
| 12 | 0.05 | 0.08 | 0.05 | 0.02 | 0.990 | 0.14 | 1100 | 1.000 | B |
| 13 | 0.05 | 0.08 | 0.05 | 0.02 | 0.995 | 0.10 | 1100 | 1.010 | A |
| 14 | 0.05 | 0.08 | 0.05 | 0.02 | 0.940 | 0.40 | 1100 | 0.995 | A |
| 15 | 0.04 | 0.33 | 0.04 | 0.01 | 0.980 | 0.20 | 1100 | 0.995 | B |
| 16 | 0.04 | 0.33 | 0.04 | 0.01 | 0.980 | 0.20 | 1100 | 0.995 | A |
| 17 | 0.04 | 0.33 | 0.04 | 0.01 | 0.985 | 0.10 | 1150 | 1.000 | A |
| 18 | 0.04 | 0.33 | 0.04 | 0.01 | 0.985 | 0.08 | 900 | 0.995 | A |
| 19 | 0 | 0.01 | 0.40 | 0.01 | 0.970 | 0.30 | 1200 | 0.990 | A |
| 20 | 0 | 0.01 | 0.40 | 0.01 | 0.980 | 0.15 | 1150 | 0.990 | A |
| 21 | 0 | 0.01 | 0.40 | 0.01 | 0.980 | 0.15 | 1150 | 0.990 | B |
| 22 | 0 | 0.01 | 0.40 | 0.01 | 0.980 | 0.15 | 1150 | 0.995 | A |
| 23 | 0 | 0.01 | 0.40 | 0.01 | 0.950 | 0.35 | 1150 | 0.950 | A |
| 24 | 0.15 | 0.01 | 0.02 | 0.01 | 0.998 | 0.15 | 1150 | 1.000 | A |
| 25 | 0.15 | 0 | 0.29 | 0.01 | 0.975 | 0.25 | 1100 | 0.980 | A |
| 26 | 0.15 | 0 | 0.29 | 0.01 | 0.990 | 0.10 | 1050 | 0.995 | A |
| 27 | 0.15 | 0 | 0.29 | 0.01 | 0.975 | 0.15 | 1050 | 1.000 | A |
| 28 | 0.15 | 0 | 0.29 | 0.01 | 0.975 | 0.15 | 1050 | 1.000 | B |
| 29 | 0.15 | 0 | 0.29 | 0.01 | 0.975 | 0.15 | 1100 | 0.940 | A |
| 30 | 0 | 0 | 0.27 | 0.01 | 1.000 | 0.25 | 1150 | 1.030 | A |
| 31 | 0 | 0 | 0.27 | 0.01 | 0.990 | 0.09 | 1150 | 1.000 | A |
| 32 | 0 | 0 | 0.27 | 0.01 | 0.990 | 0.12 | 1100 | 0.995 | A |
| 33 | 0 | 0 | 0.27 | 0.01 | 0.970 | 0.40 | 1100 | 0.990 | A |
| 34 | 0.20 | 0 | 0.20 | 0.01 | — | — | — | 0.995 | A |

The formulated powders were wet-mixed with a polyvinyl butyral binder and an organic solvent such as ethanol for at least 16 hours in a ball mill to prepare ceramic slurries. From each ceramic slurry, a sheet was formed by the doctor blade method and was cut into rectangular ceramic green sheets, each having a thickness of about 5 μm.

The ceramic green sheets were laminated and were bonded by thermal compression to form ceramic green laminates. Each ceramic green laminate was shaped into a rectangle having a predetermined size, heated to 350° C. in a nitrogen atmosphere to burn out the binder and fired at the temperatures shown in Table 2 in a hydrogen-nitrogen-water reducing atmosphere to form a ceramic sintered compact.

TABLE 2

| Sample | Firing Temperature (° C.) | Ratio of Maximum Intensity of Secondary Crystal Phases (%) | Dielectric Loss (%) | Specific Inductive Capacity | CR Product (Ω · F) | TC (ppm/° C.) | MTTF (hour) | m Value | Time to Failure of First Failed Sample (hours) |
|---|---|---|---|---|---|---|---|---|---|
| 1 | 1250 | <1.0 | 0.01 | 30 | 125000 | +4 | 550 | 3.5 | 460 |
| 2 | 1300 | 1.0 | 0.01 | 31 | 64000 | +28 | 540 | 2.5 | 310 |
| 3 | 1250 | <1.0 | 0.01 | 30 | 420000 | +5 | 460 | 3.2 | 285 |
| 4 | 1280 | 1.0 | 0.01 | 31 | 445000 | +8 | 510 | 3.7 | 370 |
| 5 | 1300 | 1.5 | 0.01 | 31 | 345000 | +10 | 480 | 4.1 | 420 |
| 6 | 1300 | 12.5 | 0.11 | 31 | 214000 | −1 | 655 | 0.5 | 90 |
| 7 | 1300 | 13.0 | 0.01 | 31 | 250000 | +2 | 160 | 0.8 | 10 |
| 8 | 1350 | 13.5 | 0.15 | 28 | 70000 | +24 | 780 | 0.4 | 20 |
| 9 | 1250 | 16.0 | 0.02 | 30 | 59000 | −15 | 90 | 2.1 | 5 |
| 10 | 1350 | | | | Not Sintered | | | | |
| 11 | 1200 | 1.5 | 0.02 | 40 | 28000 | −180 | 420 | 3.3 | 300 |
| 12 | 1250 | 2.0 | 0.03 | 41 | 28000 | −175 | 475 | 3.4 | 375 |
| 13 | 1250 | 3.5 | 0.02 | 41 | 12000 | −160 | 305 | 2.1 | 140 |
| 14 | 1200 | 12.5 | 0.03 | 39 | 8000 | −175 | 330 | 0.6 | 5 |

TABLE 2-continued

| Sample | Firing Temperature (° C.) | Ratio of Maximum Intensity of Secondary Crystal Phases (%) | Dielectric Loss (%) | Specific Inductive Capacity | CR Product (Ω · F) | TC (ppm/° C.) | MTTF (hour) | m Value | Time to Failure of First Failed Sample (hours) |
|---|---|---|---|---|---|---|---|---|---|
| 15 | 1290 | 3.5 | 0.03 | 34 | 14000 | −395 | 410 | 3.8 | 310 |
| 16 | 1250 | 4.0 | 0.04 | 34 | 11000 | −400 | 375 | 4.1 | 315 |
| 17 | 1250 | 6.5 | 0.02 | 33 | 10000 | −385 | 310 | 2.2 | 165 |
| 18 | 1300 | 13.0 | 0.25 | 33 | 4500 | −360 | 410 | 0.4 | 10 |
| 19 | 1280 | 1.5 | 0.02 | 87 | 392000 | −980 | 345 | 3.2 | 245 |
| 20 | 1280 | 2.5 | 0.02 | 85 | 350000 | −985 | 380 | 3.5 | 300 |
| 21 | 1300 | 2.0 | 0.01 | 86 | 450000 | −1000 | 420 | 3.7 | 350 |
| 22 | 1300 | <1.0 | 0.01 | 82 | 70000 | −950 | 320 | 2.8 | 225 |
| 23 | 1300 | 16.0 | 0.20 | 81 | 51000 | −950 | 20 | 1.8 | 1 |
| 24 | 1280 | 7.1 | 0.01 | 34 | 680000 | −11 | 520 | 3.8 | 380 |
| 25 | 1260 | 6.0 | 0.02 | 69 | 200000 | −740 | 300 | 1.7 | 120 |
| 26 | 1260 | 2.0 | 0.02 | 70 | 250000 | −740 | 350 | 2.8 | 235 |
| 27 | 1280 | 1.5 | 0.02 | 70 | 180000 | −755 | 410 | 2.6 | 230 |
| 28 | 1290 | 1.0 | 0.01 | 69 | 285000 | −765 | 455 | 3.3 | 355 |
| 29 | 1300 | 14.5 | 0.03 | 73 | 90000 | −760 | 35 | 2.3 | 3 |
| 30 | 1350 |  |  |  | Not Sintered |  |  |  |  |
| 31 | 1300 | 1.5 | 0.02 | 46 | 81000 | −700 | 415 | 3.8 | 325 |
| 32 | 1300 | 1.0 | 0.02 | 46 | 78000 | −690 | 365 | 3.2 | 280 |
| 33 | 1250 | 2.5 | 0.02 | 47 | 102000 | −720 | 330 | 2.9 | 200 |
| 34 | 1250 | 30.0 | 0.01 | 56 | 26000 | −620 | 35 | 1.8 | 1 |

The ceramic sintered compact was pulverized with a mortar for powder CuKα X-ray diffractometry. In the X-ray diffraction pattern, the ratio of the maximum peak intensity of secondary crystal phases to the maximum peak intensity at 2θ=25° to 35° of the perovskite primary crystal phase was determined at a tube voltage of 40 kV and a tube current of 200 mA, wherein the secondary crystal phases include all the crystal phases other than the perovskite primary crystal phase.

Monolithic ceramic capacitors were formed as follows. A conductive paste primarily composed of Ni was applied by printing onto the above-mentioned ceramic green sheets to form conductive paste layers for constituting internal electrodes extending to one edge of the sheet.

The resulting ceramic green sheets provided with the conductive paste layers were laminated so that conductive paste layers were alternately exposed at opposing sides of the laminate. A ceramic green sheet laminate was thereby formed.

The ceramic green sheet laminate was cut into rectangles having a predetermined size, heated to 350° C. in a nitrogen atmosphere to burn out the binder and fired in a hydrogen-nitrogen-water reducing atmosphere to form a monolithic ceramic sintered compact.

An external electrode paste was coated onto the two sides of the resulting monolithic ceramic compact at which internal electrodes were exposed and was fired at a temperature of 600 to 800° C. in a nitrogen atmosphere to form a monolithic ceramic capacitor provided with external electrodes electrically connected to the internal electrodes. If necessary or desired, a coating layer can be formed on the surfaces of the external electrodes by plating or the like.

The resulting monolithic ceramic capacitor had a width of 1.6 mm, a length of 3.2 mm and a thickness of 1.2 mm; the thickness of the dielectric ceramic layer was 3 $\mu$m; and the number of the effective dielectric ceramic layers was 80.

Electrical properties of the monolithic ceramic capacitor were measured. The electrostatic capacitance and the dielectric loss were measured at a frequency of 1 MHZ and a temperature of 25° C. to calculate the specific inductive capacity. The insulating resistance was measured by a DC voltage of 50V which was applied to the monolithic ceramic capacitor at 25° C. for 2 minutes to calculate the CR product.

The changes in the electrostatic capacitance with temperature at a frequency of 1 MHZ were measured at 125° C. and 25° C. and the rate of change thereof (TC) was calculated based on equation (1):

$$TC = \{(C125 - C25)/C25\} \times \{1/(125-25)\} \times 10^6 [ppm/° C.] \quad (1)$$

wherein C125 and C25 denote the electrostatic capacitances (pF) at 125° C. and 25° C., respectively.

In the high-temperature loading lifetime test, a DC voltage of 200 V was applied to 72 samples of each monolithic ceramic capacitor at a temperature of 150° C. to measure changes in insulating resistance over time. The lifetime was defined as the time at which the insulating resistance of the sample became $10^6$ Ω or less. The mean time to failure (MTTF) and the shape parameter m, which was an index of the variation in reliability, were calculated based on the Weibull probability distribution. Also, the time to failure of the first failed sample was recorded. The results are shown in Table 2.

Table 2 demonstrates that in the non-reducing dielectric ceramic layer of each of the monolithic ceramic capacitors of Samples 1 to 4, 11 to 13, 15 to 17, 19 to 22, 24 to 28 and 31 to 33, the ratio of the maximum peak intensity of secondary crystal phases to the maximum peak intensity at 2θ=25° to 35° of a perovskite primary crystal phase is about 12% or less in the X-ray diffraction pattern measured using the CuKα rays, wherein the secondary crystal phases include all the crystal phases other than the perovskite primary crystal phase.

Each monolithic ceramic capacitor exhibits a large CR product (the product of the electrostatic capacitance and the insulating resistance) of at least 1,000, a dielectric loss of 0.1% or less and a small rate of change in electrostatic resistance with temperature (TC) of −1,000 ppm/° C. or less. The mean time to failure (MTTF) in the high-temperature loading lifetime test at 150° C. and 200 V is as long as 300 hours or more. The lifetime of the first failed sample is long and the variation in the lifetime between samples is small, exhibiting high reliability.

The basis for the ratio of the maximum peak intensity of about 12% or less of the secondary crystal phases to the maximum peak intensity at 2θ=25° to 35° of the perovskite primary crystal phase in the X-ray diffraction pattern will now be described.

At a ratio of the maximum peak intensity of the secondary crystal phases to the maximum peak intensity of the perovskite primary crystal phase exceeding about 12%, the monolithic ceramic capacitor exhibits a dielectric loss of as high as 0.11 to 0.25% and a lifetime of as low as 10 to 90 hours for the first failed sample, as shown in Samples 6, 8 and 18. Alternatively, the lifetime of the first failed monolithic ceramic capacitor is as low as 5 to 10 hours in Samples 7 and 14, although the dielectric loss thereof does not increase. Moreover, the MTTF is as short as 20 to 90 hours and the lifetime of the first failed sample is 1 to 5 hours in Sample 9, 23, 29 and 34. Accordingly, these samples exhibit large variations in lifetime and deterioration of electrical properties within relatively short periods.

In contrast, at ratio of the maximum peak intensity of the secondary crystal phases to the maximum peak intensity of the perovskite primary crystal phase of about 12% or less, the dielectric loss can be suppressed to 0.1% or less due to the small content of the secondary crystal phases, resulting in improved electrical properties in the high-temperature loading lifetime test. In detail, the MTTF is at least 300 hours and the lifetime of the first failed sample is at least 120 hours with a reduced variation in the lifetime, exhibiting high reliability of the monolithic ceramic capacitors.

The non-reducing dielectric ceramic layer may contain impurities, such as aluminum, iron and magnesium. Moreover, CoO, NiO, FeO, $Al_2O_3$, MgO, $Sc_2O_3$ and rare earth oxides including $Y_2O_3$ may be added as the subsidiary components in addition to the above-described MnO, as long as the ratio of the maximum peak intensity of the secondary crystal phases to the maximum peak intensity of the perovskite primary crystal phase is about 12% or less in the X-ray diffraction pattern.

In such cases, the resulting monolithic ceramic capacitors also exhibit superior electrical properties.

Figure 2:
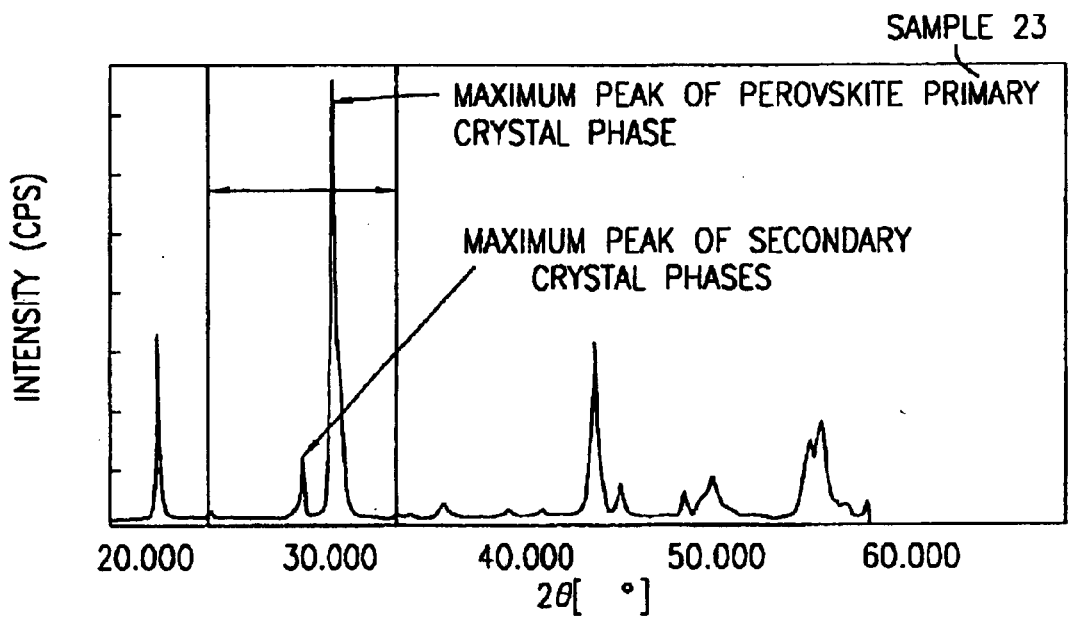
FIG. 2 illustrates an X-ray diffraction pattern of a dielectric ceramic of Sample 23.

FIG. 1 illustrates the X-ray diffraction pattern of the dielectric ceramic in the monolithic ceramic capacitor of Sample 24, in which the ratio of the maximum peak intensity of the secondary crystal phases to the maximum peak intensity of the perovskite primary crystal phase is 7.1%. FIG. 2 illustrates an X-ray diffraction pattern of the dielectric ceramic in the monolithic ceramic capacitor of Sample 23, in which the ratio is 16.0%. In these drawings, peaks with asterisks (*) are assigned to the perovskite primary crystal phase and the other peaks are assigned to the secondary crystal phases.

The average particle diameter of the uncalcined B-site component powder is preferably about 0.5 $\mu$m or less and more preferably about 0.3 $\mu$m. The lower limit thereof is not limited and is preferably about 0.01 $\mu$m or less.

As a first reason for limiting the particle size, an average particle diameter exceeding about 0.5 mm precludes a solid phase reaction, that is, synthesis of $(Zr_{1-x-y}Ti_xHf_y)_2O_4$ in the calcined B-site component powder, resulting in large amounts of residual $ZrO_2$, $TiO_2$ and $HfO_2$. When this calcined B-site component powder is used, the perovskite crystal phase (primary crystal phase) is insufficiently synthesized during calcination of the B-site component powder with the A-site component powder. However, secondary crystal phases are readily formed.

As a second reason, the formation of the solid solution of the secondary crystal phases and the primary crystal phases is insufficient in a dielectric ceramic using the calcined primary material powder due to the insufficient synthesis of the primary crystal phase, and the secondary crystal phases also remains after the calcination. Thus, the dielectric ceramic has an inhomogeneous crystal structure which causes a large variation in time to failure in the high-temperature loading lifetime test of the monolithic ceramic capacitor.

The B-site component powder is preferably calcined at a temperature of about 1,050 to 1,200° C. for 1 to 2 hours, since the solid phase reaction for forming $(Zr_{1-x-y}Ti_xHf_y)_2O_4$ barely proceeds at a calcination temperature below about 1,050° C. in the B-site component powder. When the calcination temperature exceeds about 1,200° C., the average particle diameter of the calcined B-site component undesirably increases regardless of the high degree of synthesis of $(Zr_{1-x-y}Ti_xHf_y)_2O_4$ Such a calcined B-site powder precludes the solid phase reaction during calcination with the A-site component powder, resulting in an insufficient formation of the perovskite primary crystal phase.

In the composition $(Ca_{1-v-w}Sr_vBa_w)_k(Zr_{1-x-y}Ti_xHf_y)O_3$ of the calcined primary material powder, the k value is in the range of preferably $0.95 \leq k < 1.00$ and more preferably $0.975 \leq k \leq 0.995$. At a k value below about 0.95, excessive grain growth occurs during calcination resulting in an increase in the average particle diameter of the calcined primary material powder. At a k value exceeding about 1.00, the formation of the perovskite primary crystal phase does not proceed sufficiently during the calcination of the primary material powder.

In the composition $(Ca_{1-v-w}Sr_vBa_w)_p(Zr_{1-x-y}Ti_xHf_y)O_3$ of the secondary material powder, the p value is preferably in the range of $0.98 \leq p \leq 1.02$ and more preferably $0.99 \leq p \leq 1.01$. At a p value below about 0.98, the secondary crystal phases in addition to the perovskite primary phase are formed in the crystal structure of the sintered dielectric ceramic. The formation of the secondary crystal phases contributes to the reduction in reliability of the monolithic ceramic capacitors in the high-temperature loading lifetime test when the thickness of the dielectric ceramic layer therein is about 5 $\mu$m or less. A p value exceeding about 1.02 significantly precludes the formation of the perovskite primary crystal phase and sinterability, resulting in unsuccessful sintering of the composition and deterioration of reliability of the monolithic ceramic capacitor.

In this example, elemental nickel was used in the internal electrode of the monolithic ceramic capacitor. A nickel alloy also has the same effects.

EXAMPLE 2

The same materials as those in Example 1 were used to prepare calcined primary material powders, each having the perovskite structure $ABO_3$ and composed of a A-site component and a B-site component. The primary material powder of Sample 54 was prepared by wet-mixing without calcination predetermined amounts of $CaZrO_3$, $SrTiO_3$ and $BaZrO_3$ having perovskite crystal structures based on the formulation shown in Table 3.

In order to prepare secondary material powders, $CaCO_3$, $SrCO_3$, $BaCO_3$, $ZrO_2$, $TiO_2$ and $HfO_2$ were added to 100 mols of primary material powders of Samples 41 to 54 so that the samples had p values shown in Table 3 in the composition $MnCO_3$ having a purity of at least 99% was added to the secondary material powders to prepare a secondary material powder containing a MnO secondary component so that the MnO content was 4 moles per 100 moles of the secondary material powders.

To 100 parts by weight of secondary material powder containing MnO, a sintering auxiliary (Sintering Auxiliary C) composed of 60% by weight BaO, 5% by weight $Li_2O$, 15% by weight $Ba_2O_3$ and 20% by weight $SiO_2$ was added in an amount of 10 parts by weight so as to prepare formulated powders.

TABLE 3

| | Calcined Primary Material Powder Composition | | | | | Particle Size of Uncalcined B-Site | Firing Temperature of Uncalcined B-Site | Composition of Formulated Material | |
|---|---|---|---|---|---|---|---|---|---|
| | $(Ca_{1-v-w}Sr_vBa_w)_k(Zr_{1-x-y}Ti_xHf_y)O_3$ | | | | | Component | Component | | Sintering |
| Sample | v | w | x | y | k | (μm) | (° C.) | p | Auxiliary |
| 41 | 0.02 | 0 | 0.02 | 0.01 | 0.985 | 0.10 | 1150 | 0.990 | C |
| 42 | 0.02 | 0 | 0.02 | 0.01 | 0.995 | 0.07 | 1150 | 1.000 | C |
| 43 | 0.02 | 0 | 0.02 | 0.01 | 0.990 | 0.10 | 1150 | 0.995 | C |
| 44 | 0.02 | 0 | 0.02 | 0.01 | 0.990 | 0.10 | 1250 | 1.000 | C |
| 45 | 0.02 | 0 | 0.02 | 0.01 | 0.930 | 0.35 | 1150 | 1.000 | C |
| 46 | 0.02 | 0 | 0.02 | 0.01 | 0.990 | 0.10 | 1100 | 1.040 | C |
| 47 | 0.05 | 0.08 | 0.05 | 0.02 | 0.990 | 0.15 | 1150 | 1.000 | C |
| 48 | 0.05 | 0.08 | 0.05 | 0.02 | 0.980 | 0.14 | 1150 | 1.005 | C |
| 49 | 0.05 | 0.08 | 0.05 | 0.02 | 0.940 | 0.40 | 1150 | 0.985 | C |
| 50 | 0 | 0.01 | 0.40 | 0.01 | 0.980 | 0.11 | 900 | 0.990 | C |
| 51 | 0 | 0.01 | 0.40 | 0.01 | 0.980 | 0.15 | 1150 | 0.990 | C |
| 52 | 0 | 0.01 | 0.40 | 0.01 | 0.995 | 0.09 | 1150 | 0.995 | C |
| 53 | 0 | 0.01 | 0.40 | 0.01 | 0.970 | 0.15 | 1150 | 0.970 | C |
| 54 | 0.06 | 0.09 | 0.06 | 0.02 | — | — | — | 0.995 | C |

As in EXAMPLE 1, ceramic slurries were prepared using these formulated powders, and a sheet was formed using each ceramic slurry and was cut into rectangular ceramic green sheets having the same thickness as that in EXAMPLE 1.

Ceramic sintered compacts were prepared using these ceramic green sheets as in EXAMPLE 1.

The ceramic sintered compact was pulverized with a mortar for powder CuKα X-ray diffractometry, as in EXAMPLE 1. In the X-ray diffraction pattern, the ratio of the maximum peak intensity of secondary crystal phases to the maximum peak intensity at 2θ=25° to 35° of the perovskite primary crystal phase was determined as in EXAMPLE 1.

Monolithic ceramic capacitors were formed as follows. A conductive paste primarily composed of Cu was applied by printing onto the above-mentioned ceramic green sheets to form conductive paste layers for constituting internal electrodes.

The resulting ceramic green sheets provided with the conductive paste layers were laminated as in EXAMPLE 1 to form a ceramic green sheet laminate.

The ceramic green sheet laminate was cut into rectangles having a predetermined size, and a conductive paste primarily composed of Cu as an external electrode paste was applied onto the two sides of the laminate at which the conductive paste within the laminate was exposed. After the binder in the laminate was burned out, the laminate was fired in a reducing atmosphere as in EXAMPLE 1 to form a monolithic ceramic sintered compact.

The resulting monolithic ceramic capacitor had the same dimensions as those in EXAMPLE 1, the thickness of the dielectric ceramic layer was 4 μm and the number of the effective dielectric ceramic layers was 80. Electrical properties of the monolithic ceramic capacitor were measured as in EXAMPLE 1. These results are shown in Table 4.

TABLE 4

| Sample | Firing Temperature (° C.) | Ratio of Maximum Intensity of Secondary Crystal Phases (%) | Dielectric Loss (%) | Specific Inductive Capacity | CR Product (Ω · F) | TC (ppm/° C.) | MTTF (hour) | m Value | Time to Failure of First Failed Sample (hours) |
|---|---|---|---|---|---|---|---|---|---|
| 41 | 950 | 9.5 | 0.01 | 29 | 62000 | +4 | 410 | 3.5 | 285 |
| 42 | 980 | 10.5 | 0.02 | 29 | 40000 | +28 | 345 | 2.5 | 140 |
| 43 | 950 | 11.0 | 0.01 | 28 | 55000 | +5 | 360 | 3.2 | 205 |
| 44 | 980 | 12.5 | 0.01 | 27 | 35000 | +10 | 480 | 0.9 | 30 |
| 45 | 970 | 14.0 | 0.01 | 29 | 16000 | −1 | 360 | 0.8 | 15 |
| 46 | 1020 | | | | Not Sintered | | | | |
| 47 | 1000 | 6.0 | 0.01 | 38 | 21000 | −180 | 390 | 2.7 | 235 |
| 48 | 1000 | 8.5 | 0.01 | 37 | 12000 | −160 | 310 | 2.1 | 125 |
| 49 | 1000 | 15.0 | 0.03 | 39 | 6000 | −175 | 75 | 2.4 | 15 |
| 50 | 1000 | 13.0 | 0.05 | 78 | 5000 | −990 | 240 | 0.9 | 15 |
| 51 | 1000 | 4.0 | 0.02 | 81 | 25000 | −985 | 380 | 3.8 | 330 |
| 52 | 1000 | 3.5 | 0.03 | 80 | 12000 | −995 | 305 | 2.2 | 185 |
| 53 | 1000 | 18.0 | 0.20 | 82 | 1500 | −980 | 30 | 1.5 | 5 |
| 54 | 1000 | 29.0 | 0.02 | 40 | 35000 | −180 | 220 | 0.4 | 2 |

Table 4 demonstrates that in the non-reducing dielectric ceramic layer of each of the monolithic ceramic capacitors of Samples 41 to 43, 47 to 48 and 51 to 52, the ratio of the maximum peak intensity of secondary crystal phases to the maximum peak intensity at 2θ=25° to 35° of a perovskite primary crystal phase is about 12% or less in a CuKα X-ray diffraction pattern, wherein the secondary crystal phases include all the crystal phases other than the perovskite primary crystal phase.

Each monolithic ceramic capacitor exhibits a large CR product (the product of the electrostatic capacitance and the insulating resistance) of at least 1,000, a dielectric loss of 0.1% or less and a small rate of change in electrostatic resistance with temperature (TC) of −1,000 ppm/° C. or less. The mean time to failure (MTTF) in the high-temperature loading lifetime test at 150° C. and 200 V is as long as 300 hours or more. The lifetime of the first failed sample is long and the variation in the lifetime between the samples is small, exhibiting high reliability.

At a ratio of the maximum peak intensity of the secondary crystal phases to the maximum peak intensity of the perovskite primary crystal phase exceeding about 12%, the monolithic ceramic capacitor does not exhibit superior electrical properties, as shown in Samples 44, 45, 49, 50, 53 and 54. That is, in Samples 44 and 45, the lifetime of the first failed monolithic ceramic capacitor is as low as 15 to 30 hours and the lifetime varies between the samples, although the MTTF is as long as 360 to 480 hours in the high-temperature loading lifetime test. Moreover, the MTTF is as short as 30 to 240 hours and the lifetime of the first failed sample ranges from 2 to 15 hours in Samples 49, 50, 53 and 54. Accordingly, these samples exhibit large variations in lifetime and deterioration of electrical properties within relatively short periods.

Figure 3:
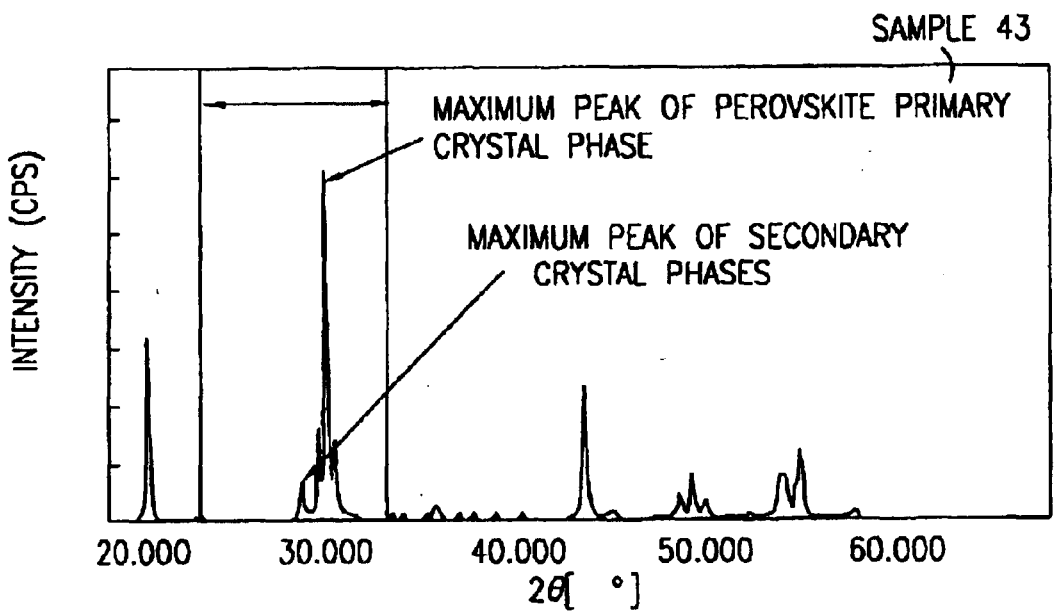
FIG. 3 illustrates an X-ray diffraction pattern of a dielectric ceramic of Sample 43.
Figure 4:
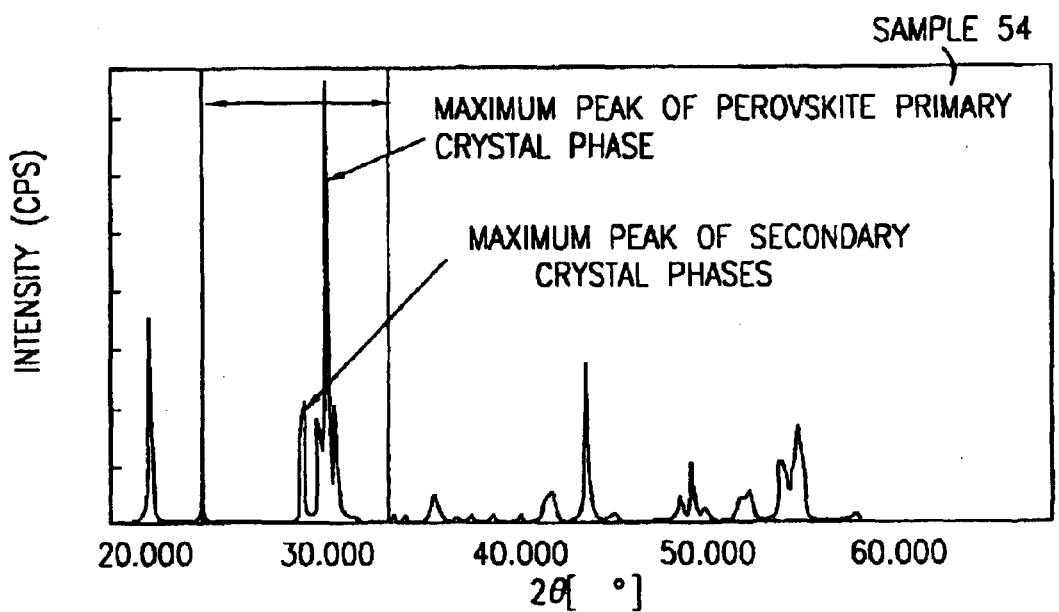
FIG. 4 illustrates an X-ray diffraction pattern of a dielectric ceramic of Sample 54.

FIG. 3 illustrates an X-ray diffraction pattern of the dielectric ceramic in the monolithic ceramic capacitor of Sample 43, in which the ratio of the maximum peak intensity of the secondary crystal phases to the maximum peak intensity of the perovskite primary crystal phase is 11.0%. FIG. 4 illustrates an X-ray diffraction pattern of the dielectric ceramic in the monolithic ceramic capacitor of Sample 54, in which the ratio is 29.0%. In these drawings, peaks with asterisks (*) are assigned to the perovskite primary crystal phase and other peaks are assigned to the secondary crystal phases.

In this example, elemental copper was used in the internal electrode of the monolithic ceramic capacitor. A copper alloy also has the same effects.

As described above, the monolithic ceramic capacitors using the ceramics based on the above EXAMPLES exhibit superior electrical properties, that is, a large CR product of at least 1,000, a small dielectric loss of 0.1% or less and a small rate of change in electrostatic resistance with temperature (TC) of −1,000 ppm/° C. or less.

The mean time to failure (MTTF) in the high-temperature loading lifetime test is at least 300 hours even when the thickness of the dielectric ceramic layer is about 5 μm or less. Moreover, the lifetime of the first failed sample is long and the variation in the lifetime between the samples is small, exhibiting high reliability.

In addition, inexpensive base metals can be used as internal electrode materials for the monolithic ceramic capacitor. Thus, compact, high-performance monolithic ceramic capacitors can be provided using elemental nickel or a nickel alloy, or elemental copper or a copper alloy exhibiting superior high-frequency characteristics.

The non-reducing dielectric ceramic of the present invention is useful as a capacitor material for temperature compensation and a dielectric resonator material for microwaves. The non-reducing dielectric ceramic is also useful as a material for a thin large-capacitance capacitor.

What is claimed is:

1. A monolithic ceramic capacitor comprising:
   at least three dielectric ceramic layers;
   at least one pair of internal electrodes each of which is disposed between a different pair of dielectric ceramic layers;
   a pair of external electrodes, each of which is electrically connected to a different one of said pair of internal electrodes;
   wherein the dielectric ceramic layers comprise a non-reducing dielectric ceramic comprising Ca, Zr and Ti as metallic elements, free of Pb, and having a perovskite primary crystal phase and other crystal phases;
   wherein the ratio of the maximum peak intensity of secondary crystal phases to the maximum peak intensity at 2θ=25° to 35° of the perovskite primary crystal phase in a CuKα X-ray diffraction pattern is about 12% or less, wherein the secondary crystal phases include all the crystal phases other than the perovskite primary crystal phase; and
   wherein the internal electrodes comprise a base metal.

2. A monolithic ceramic capacitor according to claim 1, wherein the base metal is at least one member selected from the group consisting of elemental nickel, a nickel alloy, elemental copper and a copper alloy.

3. A monolithic ceramic capacitor according to claim 2, wherein said ratio is about 5% or less.

4. A monolithic ceramic capacitor according to claim 2, wherein said ratio is about 3% or less.

5. A monolithic ceramic capacitor according to claim 1, wherein said ceramic is represented by the formula $A_pBO_3$ in which A comprises Ca, B comprises Zr and Ti, and p is about 0.98 to 1.02.

6. A monolithic ceramic capacitor according to claim 5, wherein said ratio is about 5% or less.

7. A monolithic ceramic capacitor according to claim 5, wherein p is about 0.99 to 1.01.

8. A method for making a non-reducing dielectric ceramic comprising Ca, Zr and Ti as metallic elements, free of Pb, and having a ratio of the maximum peak intensity of secondary crystal phases to the maximum peak intensity at 2θ=25° to 35° of a perovskite primary crystal phase in a CuKα X-ray diffraction pattern of about 12% or less, wherein the secondary crystal phases include all the crystal phases other than the perovskite primary crystal phase, the method comprising the steps of:
   (A) providing a calcined powder for providing the B-site component of a dielectric ceramic represented by the general formula $A_pBO_3$;
   (B) providing powder for providing the A-site component;
   (C) mixing the calcined B-site component powder and the A-site component powder to prepare an uncalcined primary material powder;
   (D) calcining the uncalcined primary material powder to prepare a calcined primary material powder;
   (E) adjusting the composition of the calcined primary material powder to realize the desired value of p by adding at least one of the A-site component powder and B-site component powder to the calcined primary material powder to prepare a secondary material powder; and
   (F) molding and sintering the secondary material powder under a neutral or reducing atmosphere.

9. A method for making a non-reducing dielectric ceramic according to claim 8, further comprising calcining a B-site component powder.

10. A method for making a non-reducing dielectric ceramic according to claim 9, wherein the B-site component powder which is calcined has an average particle diameter of about 0.5 µm or less.

11. A method for making a non-reducing dielectric ceramic according to claim 9, wherein the uncalcined B-site component powder is calcined at a temperature of about 1,050° C. to 1,200° C. for 1 to 2 hours.

12. A method for making a non-reducing dielectric ceramic according to claim 11, wherein the calcined primary material powder has an average particle diameter of about 0.8 µm or less.

13. A method for making a non-reducing dielectric ceramic according to claim 11, wherein the provided powders are such that the calcined primary material powder is a ceramic powder having a composition represented by $$(Ca_{1-v-w}Sr_vBa_w)_k(Zr_{1-x-y}Ti_xHf_y)O_3$$

wherein $0.95 \leq k \leq 1.00$, v+w is 0 to less than 1, x is greater than 0, and x+y is less than 1.

14. A method for making a non-reducing dielectric ceramic according to claim 13, wherein the secondary material powder is a ceramic powder having a composition represented by $(Ca_{1-v-w}Sr_vBa_w)p(Zr_{1-x-y}Ti_xHf_y)O_3$, and wherein p is adjusted to a value of about 0.98 to 1.02.

15. A method for making a non-reducing dielectric ceramic according to claim 14, wherein p is adjusted to a value of about 0.98 to 1.02.

16. A method for making a non-reducing dielectric ceramic according to claim 15, wherein the B-site component powder which is calcined has an average particle diameter of about 0.5 µm or less.

* * * * *